United States Patent [19]
Endo

[11] Patent Number: 5,585,969
[45] Date of Patent: Dec. 17, 1996

[54] ZOOM LENS

[75] Inventor: Hiroshi Endo, Yokohama, Japan

[73] Assignee: Canon Kabushiki Kaisha, Tokyo, Japan

[21] Appl. No.: 344,641

[22] Filed: Nov. 18, 1994

[30] Foreign Application Priority Data

Nov. 30, 1993 [JP] Japan .................. 5-299877

[51] Int. Cl.$^6$ .............. G02B 15/14; G02B 9/60
[52] U.S. Cl. .......... 359/683; 359/763; 359/764; 359/766
[58] Field of Search ............. 357/683, 684, 357/685, 763, 764, 766

[56] References Cited

U.S. PATENT DOCUMENTS

| | | | |
|---|---|---|---|
| 3,533,679 | 10/1970 | Baluteau | 359/683 |
| 3,632,188 | 1/1972 | Nakamura | 359/683 |
| 3,970,366 | 7/1976 | Sekiguchi | 359/683 |
| 4,033,674 | 7/1977 | Sekiguchi | 359/683 |
| 4,437,732 | 3/1984 | Ishiyama | 359/683 |
| 4,498,741 | 2/1985 | Ishiyama | 359/683 |
| 4,730,908 | 3/1988 | Tanaka | 359/683 |
| 4,854,685 | 8/1989 | Corbasson | 359/683 |
| 4,896,950 | 1/1990 | Endo et al. | 350/427 |
| 5,189,557 | 2/1993 | Endo | 359/683 |
| 5,241,421 | 8/1993 | Endo et al. | 359/684 |

FOREIGN PATENT DOCUMENTS

| | | |
|---|---|---|
| 58-33531 | 7/1983 | Japan . |
| 59-195214 | 11/1984 | Japan . |
| 60-39613 | 3/1985 | Japan . |
| 4-70708 | 3/1992 | Japan . |
| 5-119260 | 5/1993 | Japan . |

Primary Examiner—Georgia Y. Epps
Assistant Examiner—Ricky Mack
Attorney, Agent, or Firm—Fitzpatrick, Cella, Harper & Scinto

[57] ABSTRACT

A zoom lens includes a first lens group having a positive refracting power, a second lens group having a negative refracting power, a third lens group having a positive refracting power, a fourth lens group having a negative refracting power, and a fifth lens group having a positive refracting power in this order from the object side in order to perform zooming by varying the distance between the lens groups, the fifth lens having at least one positive lens and a cemented lens which has a negative refractive index as a whole, its positive lens being cemented to its negative lens, and the cemented surface being convex on the image side.

3 Claims, 6 Drawing Sheets

FIG. 2(A)(1)
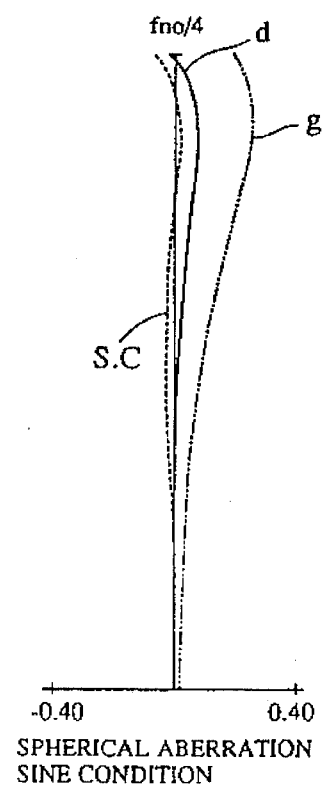
SPHERICAL ABERRATION
SINE CONDITION
FIG. 2(A)(2)
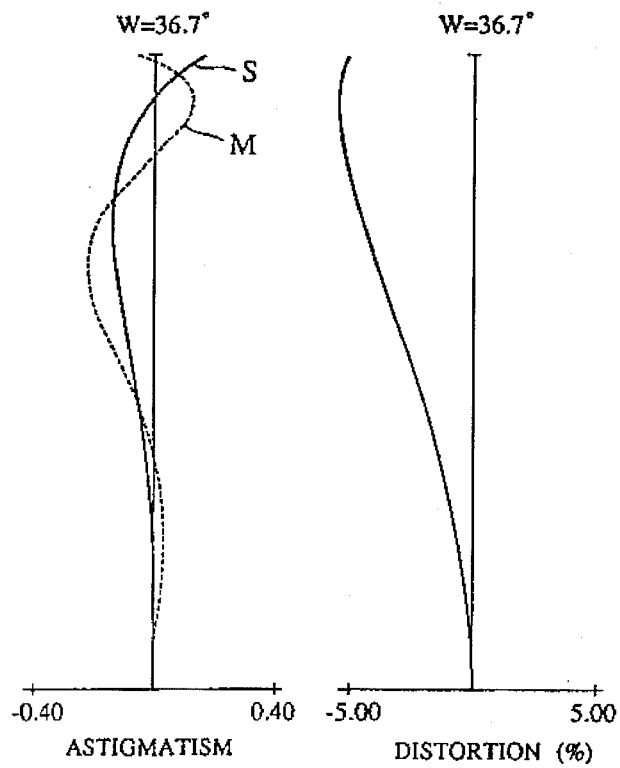
ASTIGMATISM
FIG. 2(A)(3)
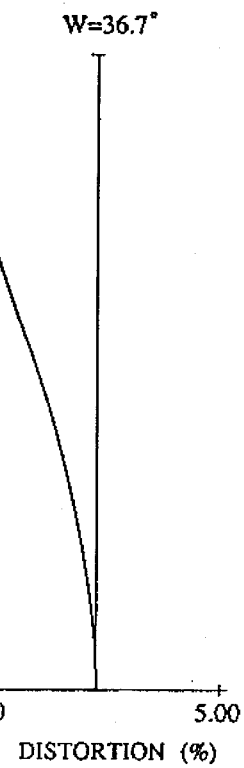
DISTORTION (%)
FIG. 2(B)(1)
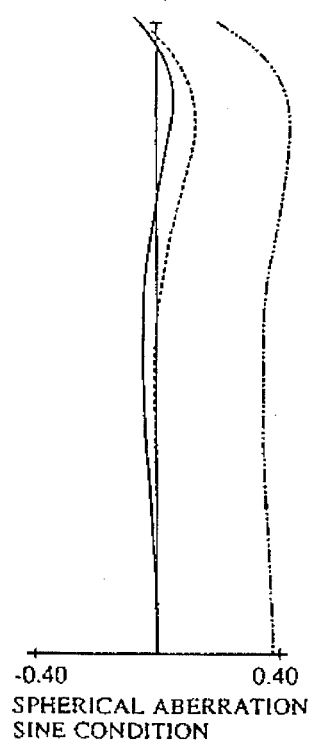
SPHERICAL ABERRATION
SINE CONDITION
FIG. 2(B)(2)
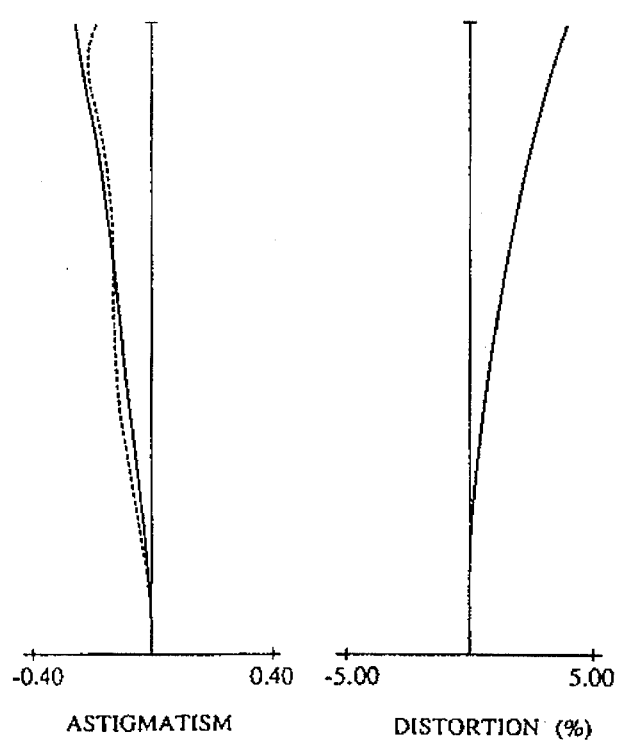
ASTIGMATISM
FIG. 2(B)(3)
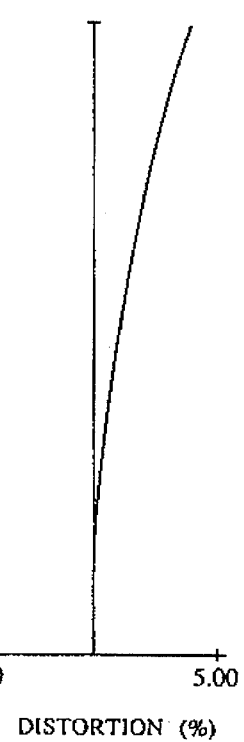
DISTORTION (%)

FIG. 3(A)(1)
fno/4.1
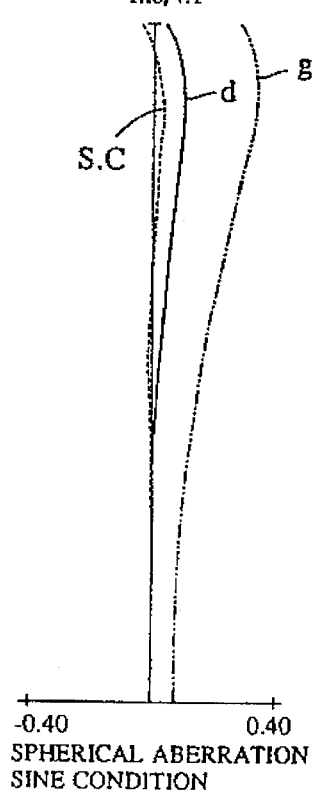
-0.40    0.40
SPHERICAL ABERRATION
SINE CONDITION
FIG. 3(A)(2)
W=36.7°
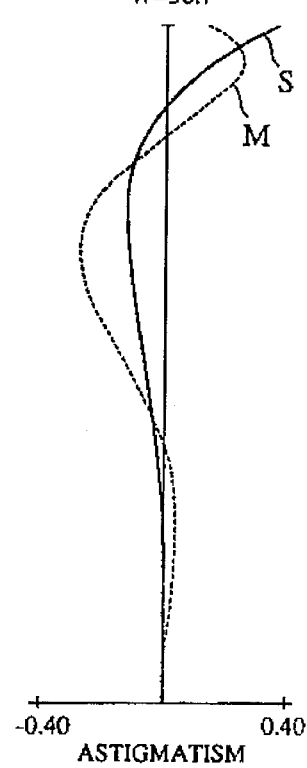
-0.40    0.40
ASTIGMATISM
FIG. 3(A)(3)
W=36.7°
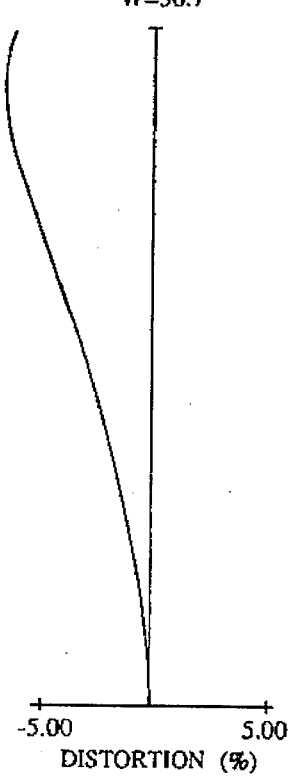
-5.00    5.00
DISTORTION (%)
FIG. 3(B)(1)
fno/5.9
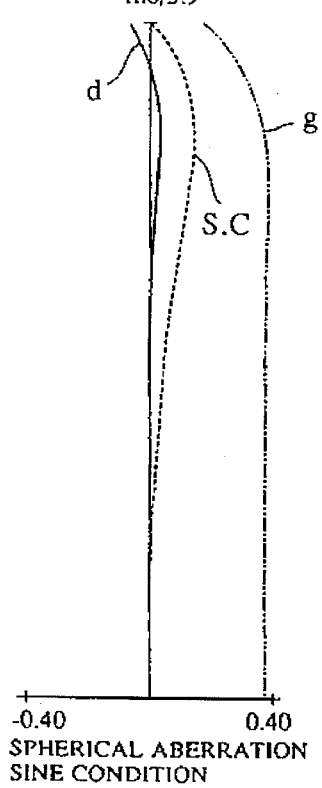
-0.40    0.40
SPHERICAL ABERRATION
SINE CONDITION
FIG. 3(B)(2)
W=6.1°
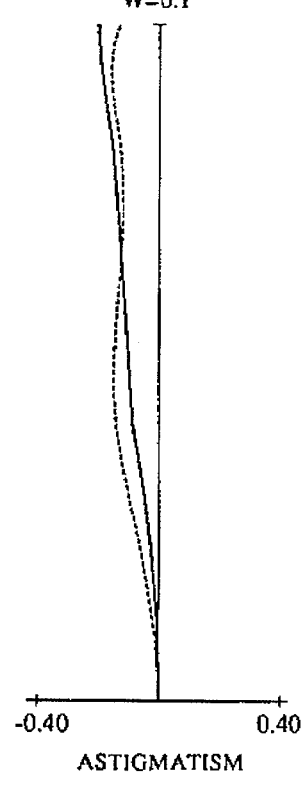
-0.40    0.40
ASTIGMATISM
FIG. 3(B)(3)
W=6.1°
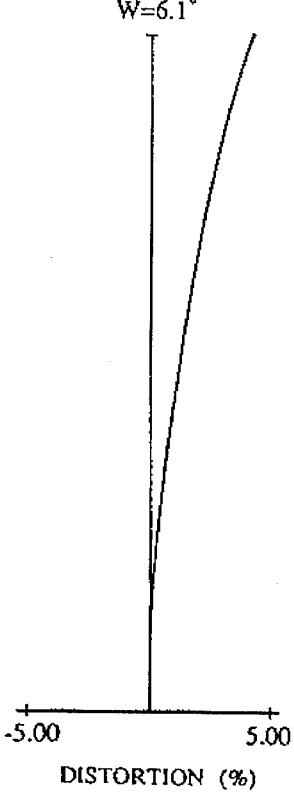
-5.00    5.00
DISTORTION (%)

FIG. 4(A)(1)
FIG. 4(A)(2)
FIG. 4(A)(3)
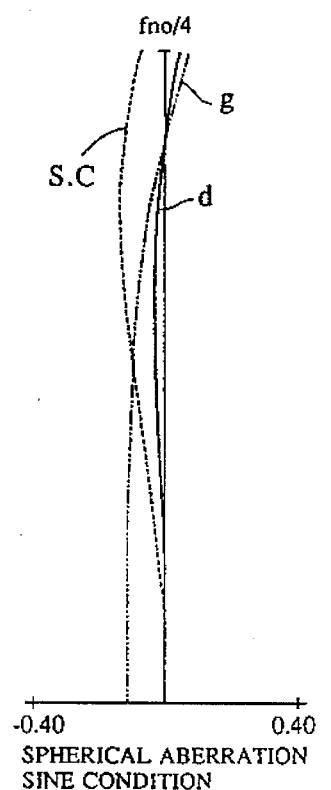
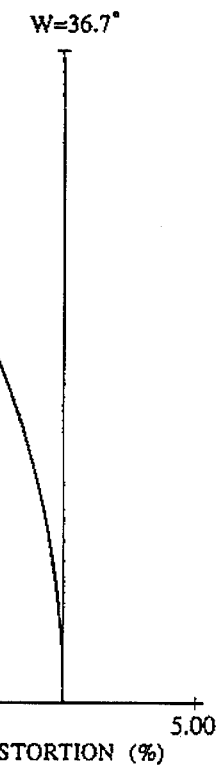
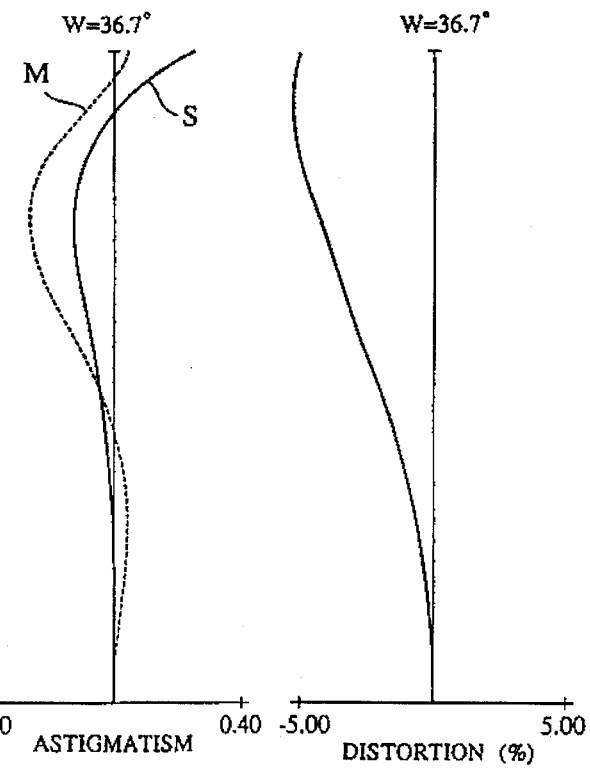
FIG. 4(B)(1)
FIG. 4(B)(2)
FIG 4(B)(3)
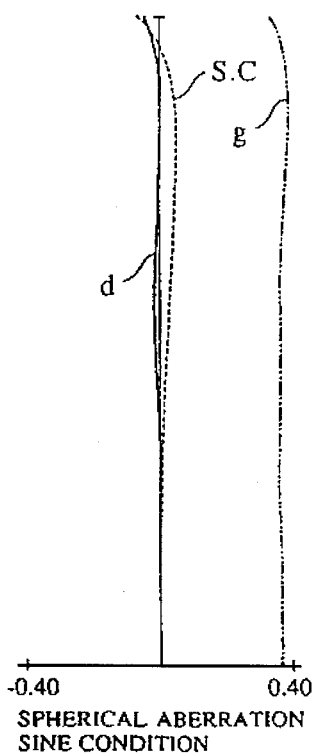
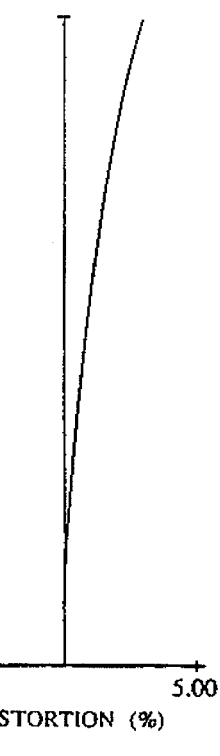
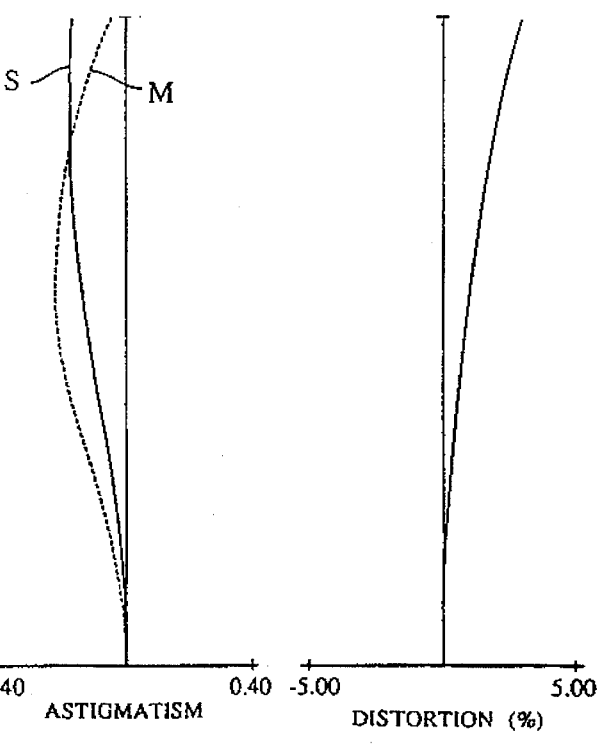

FIG. 5(A)(1)
fno/4
FIG. 5(A)(2)
W=36.7°
FIG. 5(A)(3)
W=36.7°
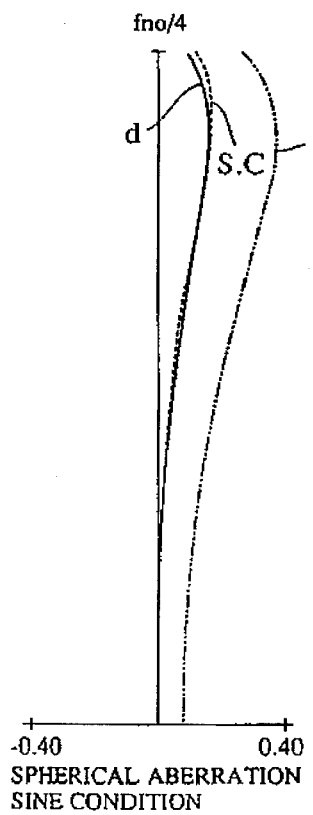
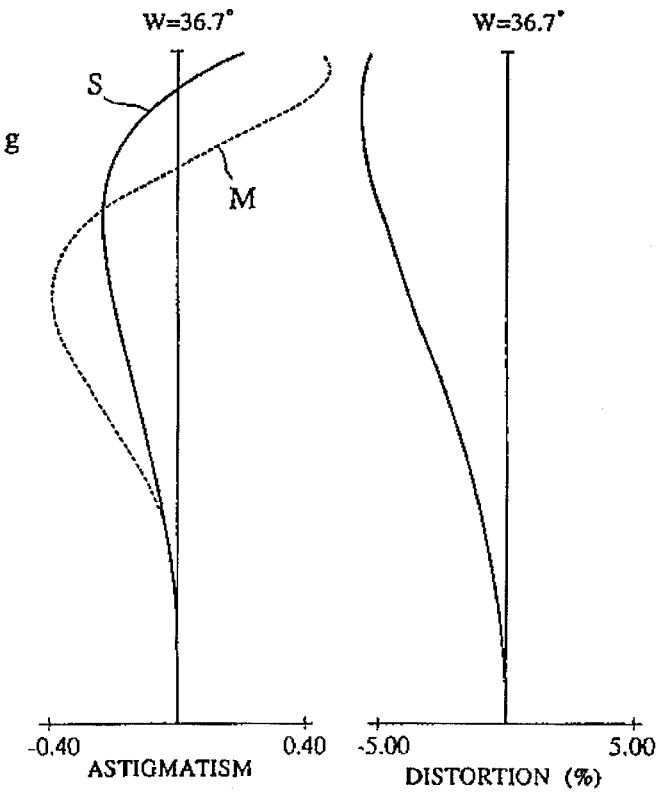
-0.40     0.40
SPHERICAL ABERRATION
SINE CONDITION
-0.40     0.40
ASTIGMATISM
-5.00     5.00
DISTORTION (%)
FIG. 5(B)(1)
fno/5.9
FIG. 5(B)(2)
W=6.1°
FIG. 5(B)(3)
W=6.1°
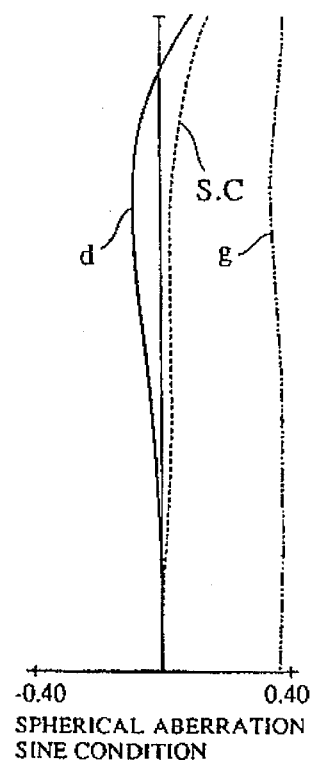
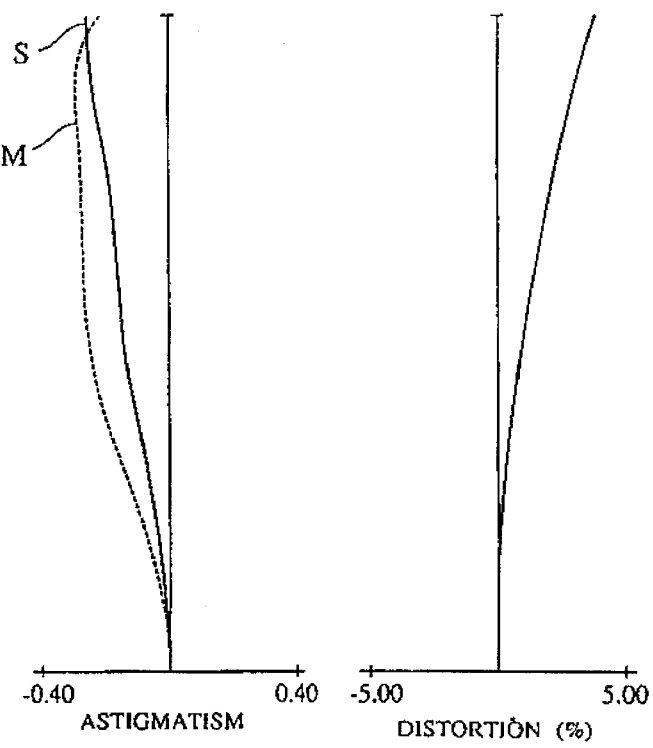
-0.40     0.40
SPHERICAL ABERRATION
SINE CONDITION
-0.40     0.40
ASTIGMATISM
-5.00     5.00
DISTORTION (%)

FIG. 6(A)(1)
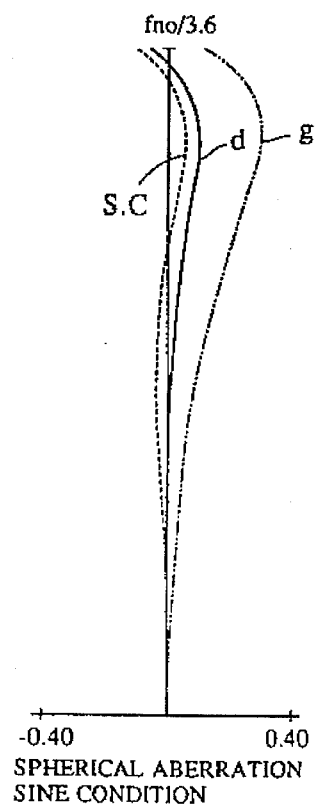
SPHERICAL ABERRATION
SINE CONDITION
FIG. 6(A)(2)
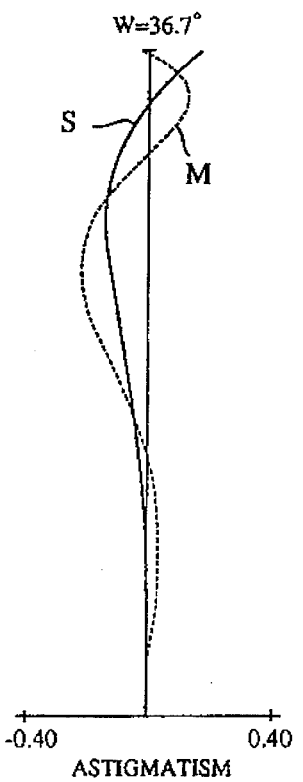
ASTIGMATISM
FIG. 6(A)(3)
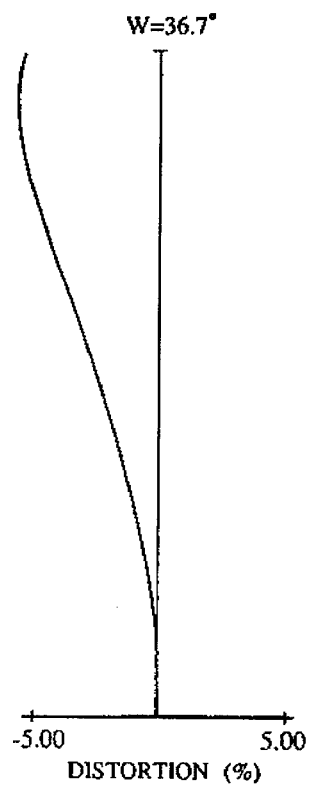
DISTORTION (%)
FIG. 6(B)(1)
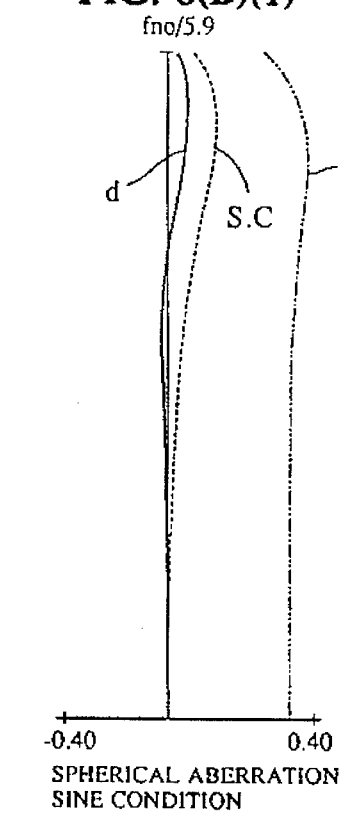
SPHERICAL ABERRATION
SINE CONDITION
FIG. 6(B)(2)
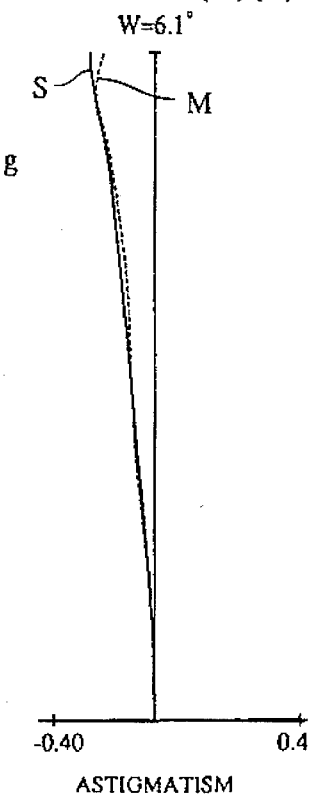
ASTIGMATISM
FIG. 6(B)(3)
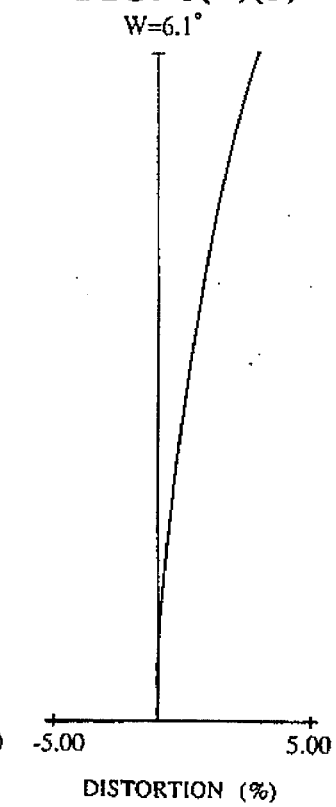
DISTORTION (%)

ZOOM LENS

BACKGROUND OF THE INVENTION

1. Field of the Invention

The present invention relates to a zoom lens and, more particularly, to a zoom lens which is suitable for a still camera and includes a wide-angle area, and has a high variable magnification ratio, specifically, about 7:1.

2. Description of the Related Art

In recent years, as a replacement lens for a single-lens reflex camera, a zoom lens has come to be in the mainstream from a single focus lens, and from now on there will be a demand for a still higher variable magnification ratio and compact zoom lens. Since autofocus has become pervasive, there has been a demand for the optical system to be suitable for autofocus.

In the main, a high variable magnification lens having a long back focus for a single-lens reflex camera is described in Japanese Patent Laid-Open Nos. 58-33531, 59-195214, 60-39613, 4-70708, and 5-119260.

In the above three publications, an attempt is made to achieve variable magnification efficiently by a five group arrangement of positive, negative, positive, negative, and positive lenses from the object side so as to achieve miniaturization. However, the miniaturization cannot be said to be sufficient, and the variable magnification ratio is about 5:1.

In a fourth conventional example, a variable magnification ratio of about 7:1 is achieved by a five group arrangement of positive, negative, positive, and negative lenses from the object side, and in the final conventional example, a zoom lens of a variable magnification ratio of about 7:1 is achieved by a five group arrangement of positive, negative, positive, and negative lenses from the object side. However, it cannot be said to have achieved sufficient optical performance.

SUMMARY OF THE INVENTION

It is an object of the present invention to provide a zoom lens having a high variable magnification ratio and high optical performance.

To achieve the above-described object, according to the present invention, there is provided a zoom lens, comprising: a first lens group having a positive refracting power, a second lens group having a negative refracting power, a third lens group having a positive refracting power, a fourth lens group having a negative refracting power, and a fifth lens group having a positive refracting power in this order from the object side in order to perform zooming by varying the distance between the lens groups, the fifth lens having at least one positive lens and a cemented lens which has a negative refracting power as a whole, the positive lens being cemented to a negative lens, and the cemented surface being convex on the image side.

When the light-beam effective diameter and the curvature radius of the cemented surface are denoted as $\phi_{SA}$ and $R_{SA}$, respectively, it is preferable that the following condition be satisfied:

$$0.55 < |R_{SA}/\phi_{SA}| < 1.5.$$

The above and further objects, aspects and novel features of the invention will more fully appear from the following detailed description when the same is read in connection with the accompanying drawings. It is to be expressly understood, however, that the drawings are for the purpose of illustration only and are not intended to limit the invention.

BRIEF DESCRIPTION OF THE DRAWINGS

FIGS. 2(A)(1)–2(A)(3) and 2(B)(1)–2(B)(3) are views of the aberrations at wide-angle end (A) (i.e., (A)(1)–(A)(3)) and telephoto end (B) (i.e., (B)(1)–(B)(3)) in accordance with a first numerical embodiment of the present invention;

FIGS. 3(A)(1)–3(A)(3) and 3(B)(1)–3(B)(3) are views of the aberrations at wide-angle end (A) (i.e., (A)(1)–(A)(3)) and telephoto end (B) (i.e., (B)(1)–(B)(3)) in accordance with a second numerical embodiment of the present invention;

FIGS. 4(A)(1)–4(A)(3) and 4(B)(1)–4(B)(3) are views of the aberrations at wide-angle end (A) (i.e., (A)(1)–(A)(3)) and telephoto end (B) (i.e., (B)(1)–(B)(3)) in accordance with a third numerical embodiment of the present invention;

FIGS. 5(A)(1)–5(A)(3) and 5(B)(1)–5(B)(3) are views of the aberrations at wide-angle end (A) (i.e., (A)(1)–(A)(3)) and telephoto end (B) (i.e., (B)(1)–(B)(3)) in accordance with a fourth numerical embodiment of the present invention; and FIGS. 6(A)(1)–6(A)(3) and 6(B)(1)–6(B)(3) are views of the aberrations at wide-angle end (A) (i.e., (A)(1)–(A)(3)) and telephoto end (B) (i.e., (B)(1)–(B)(3)) in accordance with a fifth numerical embodiment of the present invention.

DESCRIPTION OF THE PREFERRED EMBODIMENT

Figure 1:
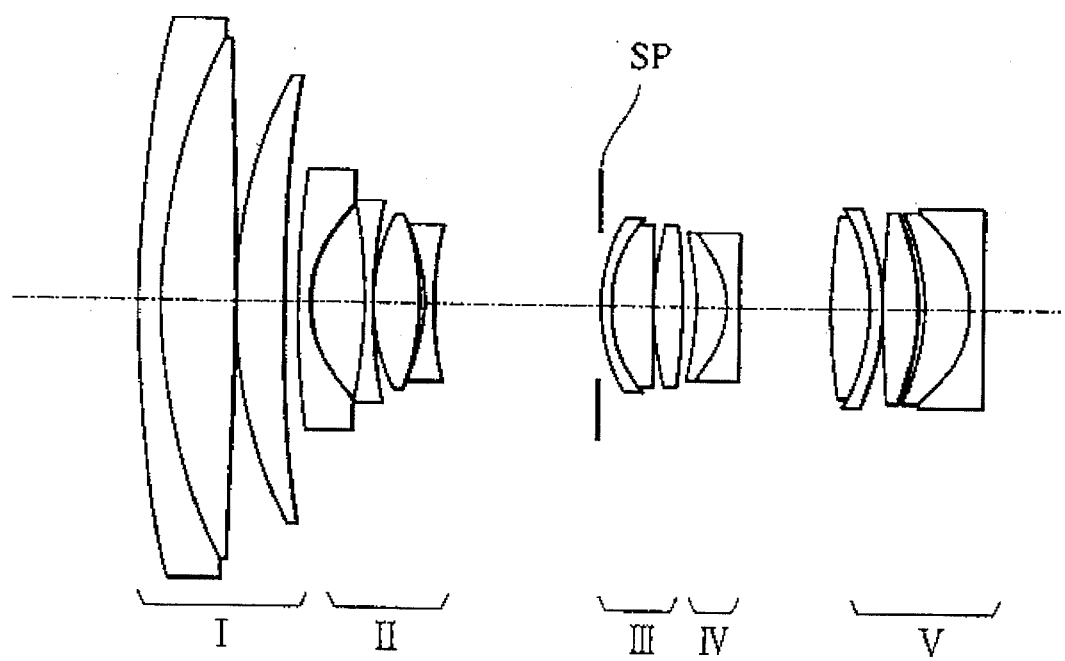
FIG. 1 is a sectional view of a zoom lens in accordance with the present invention.

An embodiment of a zoom lens of the present invention will be explained below with reference to the accompanying drawings.

In FIG. 1, reference character I denotes a first lens group having a positive refracting power; reference character II denotes a second lens group having a negative refracting power; reference character III denotes a third lens group having a positive refracting power; reference character IV denotes a fourth lens group having a negative refracting power; reference character V denotes a fifth lens group having a positive refracting power; and reference character SP denotes an aperture. Zooming from the wide-angle end to the telephoto end is performed by varying the distance between two adjacent lenses in such a way that the lens distance between the first and second lens groups becomes large, the lens distance between the second and third lens groups becomes small, the lens distance between the third and fourth lens groups becomes large, and the lens distance between the fourth and fifth lens groups becomes small. In other words, when the lens distances at the wide-angle end and the telephoto end on the axes of the i-th lens group and the (i+1)-th lens group, counting from the object side, are denoted as $D_{iW}$ and $D_{iT}$, respectively, the following conditions are satisfied:

$$D_{1W} < D_{1T}$$

$$D_{2W} < D_{2T}$$

$$D_{3W} < D_{3T}$$

$$D_{4W} < D_{4T}$$

so that variable magnification is shared by a plurality of lens groups by varying the distance between the lens groups in order to perform variable magnification efficiently. Thus, correction of the aberration at an intermediate focal distance is made possible.

To maintain excellent optical performance and suppress various aberrations which occur, at least one positive lens, and a cemented lens which has a negative refracting power as a whole, has a positive lens and a negative lens cemented together and the cemented surface being convex on the image side is disposed within the fifth lens group.

To shorten lens design time, when the light-beam effective diameter and the curvature radius of the cemented surface are denoted as $\phi_{5A}$ and $R_{5A}$, respectively, the following condition should be satisfied:

$$0.55 < |R_{5A}/\phi_{5A}| < 1.5 \tag{1}$$

Conditional equation (1) defines the ratio of the curvature radius of the cemented surface to the light-beam effective diameter, and corrects the high-order image plane curve on the wide angle side. If the absolute value of the curvature radius of the cemented surface is decreased beyond the lower limit value, the spherical aberration which occurs on this surface increases, which is undesirable. If the absolute value of the curvature radius of the cemented surface is increased beyond the upper limit value, it becomes difficult to correct a high-order sagittal image plane which tends to move toward the over side on the wide angle side. More preferably, the upper limit value is set at 0.8.

Also, when the fifth lens group is formed of a first lens having a positive refracting power, a second lens, and the cemented lens which was described earlier in this order, and when the focal distances of the first lens, the second lens, and the cemented lens are denoted as $f_{51}$, $f_{52}$, and $f_5$, respectively, it is preferable that the following conditions be satisfied:

$$0.36 < f_{51}/f_5 < 1 \tag{2}$$

$$0.36 < f_{52}/f_5 < 1 \tag{3}$$

Conditional equation (2) defines the range of the focal distance of the first lens with respect to the focal distance of the fifth lens group. If the positive refracting power increases beyond the lower limit value, the position of the principal point of the fifth lens group moves to the object side, which is advantageous for shortening the total length of the lenses. However, the spherical aberration which occurs in the first lens increases, and it is difficult to correct this aberration in a well balanced manner. If the positive refracting power of the first lens decreases beyond the lower limit value, it becomes difficult to make the lens system compact, though the decrease is advantageous for correcting the aberration.

Conditional equation (3) defines the range of the focal distance of the second lens with respect to the focal distance of the fifth lens group. The positive refracting power of the fifth lens group is shared by the first lens and the second lens so that the aberration is corrected in a well balanced manner and the lens system is made compact. If the lower limit value is exceeded, it becomes necessary to decrease the positive refracting power of the first lens or to increase the negative refracting power of the cemented lens. If the upper limit value is exceeded, it becomes necessary to decrease the positive refracting power of the first lens or to increase the negative refracting power of the cemented lens. In either case, it is difficult to manage to correct the aberration and to make the lens system compact at the same time.

Also, it becomes possible to easily provide a high variable-magnification zoom lens by defining the various conditions in the ranges described below when the focal distances of the first and third lens groups are denoted as $f_1$ and $f_3$, respectively, the focal distances of the total system at the wide-angle end and the telephoto end are denoted as $f_W$ and $f_T$, respectively, the variable magnification share values of the second and third lens groups are denoted as $Z_2$ and $Z_3$, respectively, and defined in the form of (paraxial horizontal magnification at telephoto end)/(paraxial horizontal magnification at wide-angle end):

$$0.3 < f_1/f_T < 0.8 \tag{4}$$

$$1.2 < Z_2/Z_3 < 3.0 \tag{5}$$

$$0.5 < f_3/f_W < 0.8 \tag{6}$$

Conditional equation (4) defines the focal distance of the first lens group with respect to the focal distance at the telephoto end, and makes the lens system compact. If the focal distance of the first lens group decreases beyond the lower limit value, the aberration which occurs on this group on the telephoto end side, in particular, spherical aberration, increases considerably, and it becomes difficult for the second or subsequent group to correct this aberration in a well balanced manner. If the focal distance of the first lens group increases beyond the upper limit value, it becomes difficult to make the lens system compact. More preferably, the upper limit value is set at 0.5.

Conditional equation (5) defines the ratio of the variable magnification shared value of the second lens group to the variable magnification shared value of the third lens group, and manages to correct aberration and to achieve compactness at the same time. If the variable magnification shared value of the third lens group increases beyond the lower limit value with respect to the variable magnification shared value of the second lens group, it becomes difficult to correct the aberration in a well balanced manner since the third lens group is a lens group which produces a relatively great amount of aberration. If the upper limit value is exceeded, the amount of variation in the distance for the variable magnification of the first lens group and the second lens group increases, making it difficult to achieve compactness. When the second lens is brought into focus, the variation in the aberration becomes great, which is undesirable.

Conditional equation (6) defines the focal distance of the third lens group with respect to the focal distance, and provides an excellent balance of the amount of aberration and the total length. If the focal distance of the third lens group decreases beyond the lower limit value, it becomes difficult for the other groups to correct various aberrations which occur in this lens group in a well balanced manner. If the upper limit value is exceeded, back focus increases, making it difficult to achieve the compactness of the total length.

In addition, in the first, second, fourth and fifth numerical embodiments of the present invention, one aspherical surface is used in the fifth lens group so that the coma aberration in the peripheral portion of the image plane on the wide angle side and sagittal flare are removed.

In the numerical embodiments of the present invention, by using one aspherical surface in the third lens group having a relatively high refracting power and having a great amount of aberration, it is possible to correct the aberration while the third lens group is formed of a lesser number of lenses. When zooming form the wide-angle end to the telephoto end, the first to fifth lens groups are moved to the object side independently of each other in the first to the third, and fifth numerical embodiments. In the fourth numerical embodiment, the first, second and fourth lens groups are moved to the object side independently of each other, and the third and fifth lens groups are integrally moved to the object side.

Next, a description will be given of focusing. Hitherto, as a method of focusing a zoom lens, what is commonly called front-lens focusing using a first lens group is known. The advantage of this method is that the barrel construction can be made simple because the amount of extension of focusing with respect to the same object distance is constant regardless of the focal distance. However, when the first lens group is used in a high magnification zoom lens of what is commonly called a positive lead having a positive refracting power, there are problems: for example, the lens outer diameter of the first lens group increases to secure the marginal lumination at a near distance, or the weight of the focus lens group is heavy. In recent years, an autofocus camera has come to be widely used, and there has been a demand for an optical system suitable for the autofocus camera, for example, a small amount of movement of the focus lens, a light weight, a small diameter, or the like. In view of the above, the following is conceivable as a focus method suitable for the embodiment of the present invention:

① the second lens group is used

② the first and second lens groups are integrally moved so as to bring to focus

③ the third, fourth and fifth lens groups are integrally moved so as to bring to focus.

Of these, the method ① is most suitable. In the methods ①, ②, and ③, the amount of extension of focusing with respect to the same object distance varies. According to the method proposed in, for example, Japanese Patent Laid-Open No. 3-235908 by the transferor of the present invention, it is possible to mechanically correct the defocus due to zooming by a simple construction. In this case, it is possible to correct the focusing movement with a high degree of accuracy by varying the ratio of the amount of movement of the first lens group with respect to the amount of zooming, for example, the amount of rotation of a zoom ring.

Next, numerical embodiments of the present invention will be described. In the numerical embodiments, reference character Ri denotes a curvature radius of the surface of the i-th lens surface from the object side; reference character Di denotes the thickness of the lens of the i-th lens from the object side and an air gap; reference characters Ni and Vi denote a refractive index of glass of the i-th lens from the object side and the abbe number, respectively.

In the numerical embodiments, the shape of the aspherical surface is expressed by the equation described below when the curvature radius of the lens surface is denoted as R, the optical axis (the direction the light travels) is denoted as the X axis, the direction perpendicular to the optical axis is denoted as the Y axis, B, C, D, and E are the aspherical coefficients, respectively:

$$X = \frac{(1/R)Y^2}{1 + \sqrt{1 - (Y/R)^2}} + BY^4 + CY^6 + DY^8 + EY^{10}$$

First numerical embodiment

| f = 29.0–204.0 | fno = 1:4–5.9 | 2w = 73.5°–12.1° | |
|---|---|---|---|
| r1 = 135.046 | d1 = 2.00 | n1 = 1.84666 | v1 = 23.8 |
| r2 = 60.258 | d2 = 9.00 | n2 = 1.61800 | v2 = 63.4 |
| r3 = −644.242 | d3 = 0.12 | | |
| r4 = 51.257 | d4 = 5.50 | n3 = 1.71300 | v3 = 53.8 |
| r5 = 159.102 | d5 = VARIABLE | | |
| r6 = 110.266 | d6 = 1.20 | n4 = 1.72600 | v4 = 53.6 |
| r7 = 14.607 | d7 = 5.80 | | |
| r8 = −43.951 | d8 = 1.10 | n5 = 1.80400 | v5 = 46.6 |
| r9 = 57.069 | d9 = 0.10 | | |
| r10 = 26.062 | d10 = 4.60 | n6 = 1.84666 | v6 = 23.9 |
| r11 = −37.288 | d11 = 0.71 | | |
| r12 = −27.887 | d12 = 1.10 | n7 = 1.88300 | v7 = 40.8 |
| r13 = 56.507 | d13 = VARIABLE | | |
| r14 = (APERTURE) | d14 = 0.00 | | |
| r15 = 23.739 | d15 = 1.15 | n8 = 1.84666 | v8 = 23.8 |
| r16 = 15.833 | d16 = 4.47 | n9 = 1.62299 | v9 = 58.2 |
| r17 = −355.125 | d17 = 0.12 | | |
| r18 = 32.357 | d18 = 3.20 | n10 = 1.49782 | v10 = 66.8 |
| r19 = −54.938 | d19 = VARIABLE | | |
| r20 = −45.312 | d20 = 3.27 | n11 = 1.83400 | v11 = 37.2 |
| r21 = −12.423 | d21 = 1.10 | n12 = 1.80400 | v12 = 46.6 |
| r22 = 126.169 | d22 = VARIABLE | | |
| r23 = 63.725 | d23 = 4.43 | n13 = 1.69680 | v13 = 55.5 |
| r24 = −23.622 | d24 = 1.20 | n14 = 1.84666 | v14 = 23.9 |
| r25 = −35.016 | d25 = 0.18 | | |
| r26 = 97.352 | d26 = 4.00 | n15 = 1.48749 | v15 = 70.2 |
| r27 = −29.517 | d27 = 0.52 | | |
| r28 = −27.896 | d28 = 5.30 | n16 = 1.57501 | v16 = 41.5 |
| r29 = −12.645 | d29 = 1.20 | n17 = 1.80400 | v17 = 46.6 |
| r30 = 1298.333 | | | |

| FOCAL DISTANCE VARIABLE DISTANCE | 28.99 | 50.00 | 203.99 | |
|---|---|---|---|---|
| d 5 | 1.89 | 15.57 | 39.23 | $\phi_{SA} = 20.4$ |
| d 13 | 18.26 | 13.26 | 1.55 | |
| d 19 | 1.33 | 2.76 | 8.43 | |
| d 22 | 10.75 | 8.26 | 1.50 | |

ASPHERICAL COEFFICIENTS

18TH SURFACE

| B | C | D |
|---|---|---|
| −1.538233e − 05 | −2.998191e − 08 | −2.261472e − 12 |

27TH SURFACE

| B | C | D | E |
|---|---|---|---|
| 3.287200e − 07 | −6.260109e − 08 | 2.271663e − 10 | −3.687790e − 12 |

Second numeral embodiment f = 29~204  fno = 1:4.1~5.9  2w = 73.5~12.1

| | | | |
|---|---|---|---|
| r1 = 132.530 | d1 = 2.00 | n1 = 1.84666 | v1 = 23.8 |
| r2 = 57.307 | d2 = 9.00 | n2 = 1.61800 | v2 = 63.4 |
| r3 = −408.280 | d3 = 0.12 | | |
| r4 = 44.684 | d4 = 5.50 | n3 = 1.71300 | v3 = 53.8 |
| r5 = 124.471 | d5 = VARIABLE | | |
| r6 = 131.226 | d6 = 1.20 | n4 = 1.72600 | v4 = 53.6 |
| r7 = 14.298 | d7 = 5.80 | | |
| r8 = −39.850 | d8 = 1.10 | n5 = 1.80400 | v5 = 46.6 |
| r9 = 51.144 | d9 = 0.10 | | |
| r10 = 25.296 | d10 = 4.60 | n6 = 1.84666 | v6 = 23.9 |
| r11 = −34.838 | d11 = 0.71 | | |
| r12 = −26.253 | d12 = 1.10 | n7 = 1.88300 | v7 = 40.8 |
| r13 = 60.063 | d13 = VARIABLE | | |
| r14 = (APERTURE) | d14 = 0.00 | | |
| r15 = 21.965 | d15 = 1.15 | n8 = 1.84666 | v8 = 23.8 |
| r16 = 14.777 | d16 = 4.47 | n9 = 1.62299 | v9 = 58.2 |
| r17 = −165.447 | d17 = 0.12 | | |
| r18 = 35.972 | d18 = 3.31 | n10 = 1.49782 | v10 = 66.8 |
| r19 = −40.250 | d19 = VARIABLE | | |
| r20 = −47.841 | d20 = 3.30 | n11 = 1.83400 | v11 = 37.2 |
| r21 = −11.881 | d21 = 1.10 | n12 = 1.80400 | v12 = 46.6 |
| r22 = 70.329 | d22 = VARIABLE | | |
| r23 = 86.446 | d23 = 3.86 | n13 = 1.69680 | v13 = 55.5 |
| r24 = −25.158 | d24 = 1.20 | n14 = 1.84666 | v14 = 23.9 |
| r25 = −38.099 | d25 = 0.18 | | |
| r26 = 90.733 | d26 = 4.00 | n15 = 1.48749 | v15 = 70.2 |
| r27 = −26.959 | d27 = 0.03 | | |
| r28 = −32.312 | d28 = 5.68 | n16 = 1.57501 | v16 = 41.5 |
| r29 = −12.456 | d29 = 1.20 | n17 = 1.80400 | v17 = 46.6 |
| r30 = 500.382 | | | |

| FOCAL DISTANCE VARIABLE DISTANCE | 29.00 | 49.99 | 203.95 | |
|---|---|---|---|---|
| d 5 | 1.81 | 14.28 | 35.54 | φ$_{5A}$ = 20.0 |
| d 13 | 18.74 | 13.74 | 1.50 | |
| d 19 | 1.31 | 2.68 | 6.38 | |
| d 22 | 11.53 | 8.48 | 1.49 | |

ASPHERICAL COEFFICIENTS

18TH SURFACE

| B | C | D |
|---|---|---|
| −2.437779e − 05 | −4.643977e − 08 | −2.391433e − 11 |

27TH SURFACE

| B | C | D | E |
|---|---|---|---|
| −1.898600e − 07 | −6.740544e − 08 | 2.211968e − 10 | −3.578065e − 12 |

Third numerical embodiment f = 29~204  fno = 1:4.1~5.9  2w = 73.5~12.1

| | | | |
|---|---|---|---|
| r1 = 133.141 | d1 = 2.00 | n1 = 1.84666 | v1 = 23.8 |
| r2 = 59.125 | d2 = 9.00 | n2 = 1.61800 | v2 = 63.4 |
| r3 = −897.377 | d3 = 0.12 | | |
| r4 = 50.959 | d4 = 5.50 | n3 = 1.71300 | v3 = 53.8 |
| r5 = 161.319 | d5 = VARIABLE | | |
| r6 = 109.851 | d6 = 1.20 | n4 = 1.72600 | v4 = 53.6 |
| r7 = 14.827 | d7 = 5.80 | | |

-continued

| | | | |
|---|---|---|---|
| r8 = −49.044 | d8 = 1.10 | n5 = 1.80400 | v5 = 46.6 |
| r9 = 59.565 | d9 = 0.10 | | |
| r10 = 26.642 | d10 = 4.60 | n6 = 1.84666 | v6 = 23.9 |
| r11 = −40.561 | d11 = 0.71 | | |
| r12 = −30.445 | d12 = 1.10 | n7 = 1.88300 | v7 = 40.8 |
| r13 = 47.042 | d13 = VARIABLE | | |
| r14 = (APERTURE) | d14 = 0.00 | | |
| r15 = 22.542 | d15 = 1.15 | n8 = 1.84666 | v8 = 23.8 |
| r16 = 15.601 | d16 = 4.47 | n9 = 1.62299 | v9 = 58.2 |
| r17 = −150.601 | d17 = 0.12 | | |
| r18 = 30.393 | d18 = 3.29 | n10 = 1.49782 | v10 = 66.8 |
| r19 = −62.738 | d19 = VARIABLE | | |
| r20 = −55.382 | d20 = 2.95 | n11 = 1.83400 | v11 = 37.2 |
| r21 = −13.606 | d21 = 1.10 | n12 = 1.80400 | v12 = 46.6 |
| r22 = 70.828 | d22 = VARIABLE | | |
| r23 = 488.789 | d23 = 3.16 | n13 = 1.69680 | v13 = 55.5 |
| r24 = −27.402 | d24 = 1.20 | n14 = 1.84666 | v14 = 23.9 |
| r25 = −44.005 | d25 = 0.18 | | |
| r26 = 90.838 | d26 = 4.18 | n15 = 1.48749 | v15 = 70.2 |
| r27 = −25.631 | d27 = 1.77 | | |
| r28 = −20.093 | d28 = 3.57 | n16 = 1.57501 | v16 = 41.5 |
| r29 = −14.830 | d29 = 1.20 | n17 = 1.80400 | v17 = 46.6 |
| r30 = −55.006 | | | |

| FOCAL DISTANCE VARIABLE DISTANCE | 29.00 | 49.99 | 203.97 | |
|---|---|---|---|---|
| d 5 | 1.86 | 15.46 | 38.39 | $\phi_{5A} = 20.8$ |
| d 13 | 19.45 | 14.00 | 1.53 | |
| d 19 | 1.32 | 2.77 | 10.14 | |
| d 22 | 11.31 | 8.85 | 1.49 | |

ASPHERICAL COEFFICIENTS

18TH SURFACE

| B | C | D |
|---|---|---|
| −1.704700e − 05 | −2.974074e − 08 | −7.236521e − 11 |

Fourth numerical embodiment

| | | | |
|---|---|---|---|
| f = 29~203.9 | fno = 1:4~5.9 | 2w = 73.5~12.1 | |
| r1 = 135.588 | d1 = 2.00 | n1 = 1.84666 | v1 = 23.8 |
| r2 = 59.318 | d2 = 9.00 | n2 = 1.61800 | v2 = 63.4 |
| r3 = −726.996 | d3 = 0.12 | | |
| r4 = 50.458 | d4 = 5.50 | n3 = 1.71300 | v3 = 53.8 |
| r5 = 163.029 | d5 = VARIABLE | | |
| r6 = 99.320 | d6 = 1.20 | n4 = 1.72600 | v4 = 53.6 |
| r7 = 14.548 | d7 = 5.80 | | |
| r8 = −51.822 | d8 = 1.10 | n5 = 1.80400 | v5 = 46.6 |
| r9 = 44.185 | d9 = 0.10 | | |
| r10 = 24.271 | d10 = 4.60 | n6 = 1.84666 | v6 = 23.9 |
| r11 = −37.039 | d11 = 0.71 | | |
| r12 = −26.953 | d12 = 1.10 | n7 = 1.88300 | v7 = 40.8 |
| r13 = 54.547 | d13 = VARIABLE | | |
| r14 = (APERTURE) | d14 = 0.00 | | |
| r15 = 23.580 | d15 = 1.15 | n8 = 1.84666 | v8 = 23.8 |
| r16 = 15.418 | d16 = 4.47 | n9 = 1.62299 | v9 = 58.2 |
| r17 = −1899.712 | d17 = 0.12 | | |
| r18 = 32.251 | d18 = 3.15 | n10 = 1.49782 | v10 = 66.8 |
| r19 = −55.685 | d19 = VARIABLE | 1.83400 | |
| r20 = −42.727 | d20 = 3.40 | n11 = | v11 = 37.2 |
| r21 = −11.455 | d21 = 1.10 | n12 = 1.80400 | v12 = 46.6 |
| r22 = 148.978 | d22 = VARIABLE | | |
| r23 = 54.671 | d23 = 4.46 | n13 = 1.69680 | v13 = 55.5 |
| r24 = −22.875 | d24 = 1.20 | n14 = 1.84666 | v14 = 23.9 |
| r25 = −34.832 | d25 = 0.18 | | |
| r26 = 88.600 | d26 = 4.19 | n15 = 1.48749 | v15 = 70.2 |
| r27 = −30.018 | d27 = 0.65 | | |
| r28 = −26.649 | d28 = 5.09 | n16 = 1.57501 | v16 = 41.5 |
| r29 = −12.700 | d29 = 1.20 | n17 = 1.80400 | v17 = 46.6 |
| r30 = 2418.824 | | | |

| FOCAL DISTANCE VARIABLE DISTANCE | 28.99 | 50.00 | 203.92 | |
|---|---|---|---|---|
| d 5 | 1.84 | 15.14 | 38.67 | $\phi_{5A} = 20.0$ |
| d 13 | 17.99 | 13.01 | 1.50 | |

-continued

|   | | | |
|---|---|---|---|
| d 19 | 1.30 | 3.61 | 10.10 |
| d 22 | 10.28 | 7.96 | 1.48 |

ASPHERICAL COEFFICIENTS

18TH SURFACE

| B | C | D |
|---|---|---|
| −1.503374e − 05 | −2.312176e − 08 | −9.846890e − 11 |

27TH SURFACE

| B | C | D | E |
|---|---|---|---|
| −1.898600e − 07 | −6.740544e − 08 | 2.211968e − 10 | 3.578065e − 12 |

Fifth numerical embodiment

| f = 29~204 | fno = 1:3.6~5.9 | 2w = 73.4~12.1 | |
|---|---|---|---|
| r1 = 138.950 | d1 = 2.00 | n1 = 1.84666 | v1 = 23.8 |
| r2 = 60.991 | d2 = 9.00 | n2 = 1.61800 | v2 = 63.4 |
| r3 = −518.120 | d3 = 0.12 | | |
| r4 = 51.060 | d4 = 5.50 | n3 = 1.71300 | v3 = 53.8 |
| r5 = 155.570 | d5 = VARIABLE | | |
| r6 = 125.968 | d6 = 1.20 | n4 = 1.72600 | v4 = 53.6 |
| r7 = 14.830 | d7 = 5.80 | | |
| r8 = −45.710 | d8 = 1.10 | n5 = 1.80400 | v5 = 46.6 |
| r9 = 52.639 | d9 = 0.10 | | |
| r10 = 26.146 | d10 = 4.60 | n6 = 1.84666 | v6 = 23.9 |
| r11 = −37.002 | d11 = 0.71 | | |
| r12 = −28.050 | d12 = 1.10 | n7 = 1.88300 | v7 = 40.8 |
| r13 = 58.411 | d13 = VARIABLE | | |
| r14 = (APERTURE) | d14 = 0.00 | | |
| r15 = 23.692 | d15 = 1.15 | n8 = 1.84666 | v8 = 23.8 |
| r16 = 15.865 | d16 = 4.47 | n9 = 1.62299 | v9 = 58.2 |
| r17 = −587.291 | d17 = 0.12 | | |
| r18 = 30.612 | d18 = 3.20 | n10 = 1.49782 | v10 = 66.8 |
| r19 = −59.203 | d19 = VARIABLE | | |
| r20 = −46.719 | d20 = 3.82 | n11 = 1.83400 | v11 = 37.2 |
| r21 = −12.645 | d21 = 1.10 | n12 = 1.80400 | v12 = 46.6 |
| r22 = 125.734 | d22 = VARIABLE | | |
| r23 = 64.646 | d23 = 4.41 | n13 = 1.69680 | v13 = 55.5 |
| r24 = −24.112 | d24 = 1.20 | n14 = 1.84666 | v14 = 23.9 |
| r25 = −35.910 | d25 = 0.18 | | |
| r26 = 89.655 | d26 = 4.04 | n15 = 1.48749 | v15 = 70.2 |
| r27 = −28.938 | d27 = 0.53 | | |
| r28 = −26.745 | d28 = 5.48 | n16 = 1.57501 | v16 = 41.5 |
| r29 = −12.530 | d29 = 1.20 | n17 = 1.80400 | v17 = 46.6 |
| r30 = 18507.355 | | | |

| FOCAL DISTANCE VARIABLE DISTANCE | 29.00 | 49.99 | 203.98 | |
|---|---|---|---|---|
| d 5 | 1.86 | 15.41 | 39.20 | $\phi_{5A}$ = 20.4 |
| d 13 | 18.37 | 13.36 | 1.54 | |
| d 19 | 1.32 | 2.70 | 7.55 | |
| d 22 | 10.33 | 7.90 | 1.49 | |

ASPHERICAL COEFFICIENTS

18TH SURFACE

| B | C | D |
|---|---|---|
| −1.489448e − 05 | −2.616801e − 08 | −4.297861e − 11 |

27TH SURFACE

| B | C | D | E |
|---|---|---|---|
| −1.898600e − 07 | −6.740544e − 08 | 2.211968e − 10 | −3.578065e − 12 |

TABLE

| CONDITIONAL EQUATION | FIRST EMBODIMENT | SECOND EMBODIMENT | THIRD EMBODIMENT | FOURTH EMBODIMENT | FIFTH EMBODIMENT |
|---|---|---|---|---|---|
| $|R5_A|/\phi5_A$ | 0.631 | 0.623 | 0.711 | 0.634 | 0.614 |
| $f_{51}/f_5$ | 0.565 | 0.574 | 0.841 | 0.599 | 0.566 |
| $f_{52}/f_5$ | 0.747 | 0.593 | 0.531 | 0.831 | 0.708 |
| $f_1/f_T$ | 0.380 | 0.343 | 0.383 | 0.376 | 0.378 |
| $Z_2/Z_3$ | 1.908 | 2.226 | 1.643 | 1.882 | 1.963 |
| $f_3/f_W$ | 0.765 | 0.690 | 0.706 | 0.789 | 0.770 |

According to the present invention, as described above, it is possible to provide a zoom lens having excellent optical performance, though compact, while providing a high variable magnification ratio.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the claims. The following claims are to be accorded the broadest interpretation, so as to encompass all such modifications and equivalent structures and functions.

What is claimed is:

1. A zoom lens, comprising:
   a first lens group having a positive refracting power, a second lens group having a negative refracting power, a third lens group having a positive refracting power, a fourth lens group having a negative refracting power, and a fifth lens group having a positive refracting power in this order from an object side, said zoom lens performing zooming by varying a distance between the lens groups, said fifth lens group having at least one positive lens and a cemented lens which has a negative refracting power as a whole, said cemented lens including a positive lens cemented to a negative lens, the cemented surface being convex on the image side, wherein said fifth lens group has a first positive lens, a second positive lens, and said cemented lens in this order from the object side, and when focal distances of said first lens, said second lens, and said fifth lens group are denoted as $f_{51}$, $f_{52}$, and $f_5$, respectively, the following conditions are satisfied:

$0.36 < f_{51}/f_5 < 1$ $0.36 < f_{52}/f_5 < 1$.

2. A zoom lens according to claim 1, wherein when a light beam effective diameter and a curvature radius of the cemented surface are denoted as $\phi_{5A}$ and $R_{5A}$, respectively, the following condition is satisfied:

$0.55 < |R_{5A}/\Phi_{5A}| < 1.5$.

3. A zoom lens according to claim 1 or 2, wherein focal distances of said first lens group and said third lens group, at a wide-angle end and a telephoto end of said zoom lens are denoted as $f_1$, $f_3$, $f_W$, and $f_T$, respectively, and when variable magnification shared values of said second and third lens groups are denoted as $Z_2$ and $Z_3$, wherein $Z_2$=(paraxial horizontal magnification at telephoto end)/(paraxial horizontal magnification at wide-angle end) for said second lens group and $Z_3$=(paraxial horizontal magnification at telephoto end)/(paraxial horizontal magnification at wide-angle end) for said third lens group, respectively, the following conditions are satisfied:

$0.3 < f_1/f_T < 0.8$ $1.2 < Z_2/Z_3 < 3.0$ $0.5 < f_3/f_W < 0.8$.

* * * * *

UNITED STATES PATENT AND TRADEMARK OFFICE
CERTIFICATE OF CORRECTION

PATENT NO. : 5,585,969
DATED : December 17, 1996
INVENTOR(S) : HIROSHI ENDO

It is certified that error appears in the above-indentified patent and that said Letters Patent is hereby corrected as shown below:

COLUMN 4

Line 64, "form" should read --from--.

COLUMN 9

Lines 54 and 55,
```
     "d19 = VARIABLE                1.83400
      d20 = 3.40           n11 =            "
   should read
    --d19 = VARIABLE
      d20 = 3.40           n11 = 1.83400--.
```

Signed and Sealed this

Eighth Day of July, 1997

BRUCE LEHMAN

*Attest:*

*Attesting Officer*     *Commissioner of Patents and Trademarks*